US012606050B1

(12) United States Patent
Zhang et al.

(10) Patent No.: US 12,606,050 B1
(45) Date of Patent: Apr. 21, 2026

(54) BATTERY MANAGEMENT SYSTEM AND METHOD

(71) Applicant: GM Global Technology Operations LLC, Detroit, MI (US)

(72) Inventors: Anne Zhang, Troy, MI (US); Brian J. Koch, Berkley, MI (US); Jing Gao, Rochester, MI (US); Suryanarayana Kolluri, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/921,480

(22) Filed: Oct. 21, 2024

(51) Int. Cl.
| | |
|---|---|
| *H01M 10/48* | (2006.01) |
| *B60L 50/60* | (2019.01) |
| *B60L 53/20* | (2019.01) |
| *B60L 58/10* | (2019.01) |
| *H01M 10/04* | (2006.01) |

(52) U.S. Cl.
CPC .............. *B60L 58/10* (2019.02); *B60L 50/60* (2019.02); *B60L 53/20* (2019.02)

(58) Field of Classification Search
CPC ........... B60L 58/10; B60L 50/60; B60L 53/20
See application file for complete search history.

(56) References Cited

U.S. PATENT DOCUMENTS

| | | | |
|---|---|---|---|
| 9,728,992 | B2 | 8/2017 | Takahashi |
| 12,113,184 | B2 | 10/2024 | Gao et al. |
| 2011/0250478 | A1* | 10/2011 | Timmons .............. H01M 4/587 |
| | | | 429/91 |
| 2022/0413058 | A1* | 12/2022 | Kim ..................... G01R 31/367 |

FOREIGN PATENT DOCUMENTS

DE          102019105471 A1          9/2019

* cited by examiner

*Primary Examiner* — Elim Ortiz
(74) *Attorney, Agent, or Firm* — Vivacqua Crane, PLLC

(57) ABSTRACT

According to several aspects, a battery management method may include adjusting an operation of a battery cell based at least in part on a plurality of battery metrics including a first battery metric, a second battery metric, a third battery metric, and a fourth battery metric. The operation of the battery cell is adjusted to maintain at least a first battery metric within a first predetermined range, a second battery metric within a second predetermined range, a third battery metric within a third predetermined range, and a fourth battery metric within a fourth predetermined range.

14 Claims, 4 Drawing Sheets

BATTERY MANAGEMENT SYSTEM AND METHOD

INTRODUCTION

The present disclosure relates to systems and methods for battery management for battery cells.

Battery management systems have been developed to control various battery metrics (e.g., voltages and/or currents within a battery). Battery management systems may include one or more voltage, current, and/or temperature sensors, one or more power control devices (e.g., power semiconductor switches, relays, contactors, and/or the like), and a battery management controller configured to perform measurements using the one or more sensors and control the operation of the battery cell using the one or more power control devices. To increase performance, ease-of-use, and usable life of battery cells, it is advantageous to maintain the various battery metrics within predetermined ranges. However, the various battery metrics may have a highly non-linear or unknown dependence on each other, such that adjustment of battery operation to achieve an optimal value of all of the various battery metrics is non-trivial. Accordingly, current battery management systems and methods may utilize resource intensive and/or unreliable techniques to regulate battery operation.

Thus, while current battery management systems and methods achieve their intended purpose, there is a need for a new and improved system and method for controlling battery metrics of a battery cell.

SUMMARY

According to several aspects, a battery management method for a three-electrode battery cell is provided. The battery management method may include adjusting an operation of the three-electrode battery cell based at least in part on a plurality of battery metrics including a first battery metric, a second battery metric, a third battery metric, and a fourth battery metric. The operation of the three-electrode battery cell is adjusted to maintain at least a first battery metric within a first predetermined range, a second battery metric within a second predetermined range, a third battery metric within a third predetermined range, and a fourth battery metric within a fourth predetermined range.

In another aspect of the present disclosure, adjusting the operation of the three-electrode battery cell further may include determining the plurality of battery metrics. Adjusting the operation of the three-electrode battery cell further may include adjusting the operation of the three-electrode battery cell in response to determining the plurality of battery metrics.

In another aspect of the present disclosure, determining the plurality of battery metrics further may include determining the first battery metric. The first battery metric is an anode voltage between an anode electrode and a reference electrode of the three-electrode battery cell. Measuring the plurality of battery metrics further may include determining the second battery metric. The second battery metric is a cathode voltage between a cathode electrode and the reference electrode of the three-electrode battery cell. Measuring the plurality of battery metrics further may include determining the third battery metric. The third battery metric is a cell voltage between the cathode electrode and the anode electrode of the three-electrode battery cell. Measuring the plurality of battery metrics further may include determining the fourth battery metric. The fourth battery metric is a cell current flowing through the three-electrode battery cell.

In another aspect of the present disclosure, adjusting the operation of the three-electrode battery cell further may include adjusting one or more of: an applied voltage across two or more electrodes of the three-electrode battery cell and a current flowing through the three-electrode battery cell for at least a predetermined time period.

In another aspect of the present disclosure, determining the plurality of battery metrics and adjusting the operation of the three-electrode battery cell further may include determining the plurality of battery metrics and adjusting the operation of the three-electrode battery cell in a predetermined sequence until the first battery metric is within the first predetermined range, the second battery metric is within the second predetermined range, the third battery metric is within the third predetermined range, and the fourth battery metric is within the fourth predetermined range.

In another aspect of the present disclosure, determining the plurality of battery metrics and adjusting the operation of the three-electrode battery cell in the predetermined sequence further may include determining the first battery metric. Measuring the plurality of battery metrics and adjusting the operation of the three-electrode battery cell in the predetermined sequence further may include comparing the first battery metric to the first predetermined range. Measuring the plurality of battery metrics and adjusting the operation of the three-electrode battery cell in the predetermined sequence further may include adjusting the operation of the three-electrode battery cell to cause the first battery metric to be within the first predetermined range in response to determining that the first battery metric is outside of the first predetermined range.

In another aspect of the present disclosure, the battery management method further may include determining the second battery metric in response to adjusting the operation of the three-electrode battery cell to cause the first battery metric to be within the first predetermined range. The battery management method further may include comparing the second battery metric to the second predetermined range. The battery management method further may include adjusting the operation of the three-electrode battery cell to cause the second battery metric to be within the second predetermined range in response to determining that the second battery metric is outside of the second predetermined range.

In another aspect of the present disclosure, the battery management method further may include determining the third battery metric in response to adjusting the operation of the three-electrode battery cell to cause the second battery metric to be within the second predetermined range. The battery management method further may include comparing the third battery metric to the third predetermined range. The battery management method further may include adjusting the operation of the three-electrode battery cell to cause the third battery metric to be within the third predetermined range in response to determining that the third battery metric is outside of the third predetermined range.

In another aspect of the present disclosure, the battery management method further may include determining the fourth battery metric in response to adjusting the operation of the three-electrode battery cell to cause the third battery metric to be within the third predetermined range. The battery management method further may include comparing the fourth battery metric to the fourth predetermined range. The battery management method further may include adjusting the operation of the three-electrode battery cell to cause the fourth battery metric to be within the fourth predetermined range in response to determining that the fourth battery metric is outside of the fourth predetermined range.

In another aspect of the present disclosure, the battery management method further may include determining the first battery metric in response to adjusting the operation of the three-electrode battery cell to cause the fourth battery metric to be within the fourth predetermined range. The battery management method further may include comparing the first battery metric to the first predetermined range. The battery management method further may include adjusting the operation of the three-electrode battery cell to cause the first battery metric to be within the first predetermined range in response to determining that the first battery metric is outside of the first predetermined range.

According to several aspects, a battery management system may include a three-electrode battery cell including an anode electrode, a cathode electrode, and a reference electrode. The battery management system further may include a plurality of battery sensors in electrical communication with the three-electrode battery cell. The battery management system further may include a power control circuit in electrical communication with the three-electrode battery cell. The battery management system further may include a controller in electrical communication with the plurality of battery sensors and the power control circuit. The controller is programmed to adjust an operation of the three-electrode battery cell using the power control circuit based at least in part on a plurality of battery metrics determined using the plurality of battery sensors. The plurality of battery metrics includes an anode voltage between the anode electrode and the reference electrode of the three-electrode battery cell, a cathode voltage between the cathode electrode and the reference electrode of the three-electrode battery cell, a cell voltage between the cathode electrode and the anode electrode of the three-electrode battery cell, and a cell current flowing through the three-electrode battery cell.

In another aspect of the present disclosure, to adjust the operation of the three-electrode battery cell, the controller is further programmed to adjust one or more of: an applied voltage across two or more electrodes of the three-electrode battery cell and a current flowing through the three-electrode battery cell for at least a predetermined time period using the power control circuit.

In another aspect of the present disclosure, to determine the plurality of battery metrics and adjust the operation of the three-electrode battery cell, the controller is further programmed to determine the plurality of battery metrics in a predetermined sequence and adjust the operation of the three-electrode battery cell in the predetermined sequence until the anode voltage is within a first predetermined range, the cathode voltage is within a second predetermined range, the cell voltage is within a third predetermined range, and the cell current is within a fourth predetermined range. The predetermined sequence is the anode voltage followed by the cathode voltage followed by the cell voltage followed by the cell current.

In another aspect of the present disclosure, to determine the plurality of battery metrics and adjust the operation of the three-electrode battery cell in the predetermined sequence, the controller is further programmed to determine the anode voltage. To determine the plurality of battery metrics and adjust the operation of the three-electrode battery cell in the predetermined sequence, the controller is further programmed to compare the anode voltage to the first predetermined range. To determine the plurality of battery metrics and adjust the operation of the three-electrode battery cell in the predetermined sequence, the controller is further programmed to adjust the operation of the three-electrode battery cell using the power control circuit to cause the anode voltage to be within the first predetermined range in response to determining that the anode voltage is outside of the first predetermined range.

In another aspect of the present disclosure, the controller is further programmed to determine the cathode voltage in response to adjusting the operation of the three-electrode battery cell to cause the anode voltage to be within the first predetermined range. The controller is further programmed to compare the cathode voltage to the second predetermined range. The controller is further programmed to adjust the operation of the three-electrode battery cell using the power control circuit to cause the cathode voltage to be within the second predetermined range in response to determining that the cathode voltage is outside of the second predetermined range.

In another aspect of the present disclosure, the controller is further programmed to determine the cell voltage in response to adjusting the operation of the three-electrode battery cell to cause the cathode voltage to be within the second predetermined range. The controller is further programmed to compare the cell voltage to the third predetermined range. The controller is further programmed to adjust the operation of the three-electrode battery cell using the power control circuit to cause the cell voltage to be within the third predetermined range in response to determining that the cell voltage is outside of the third predetermined range.

In another aspect of the present disclosure, the controller is further programmed to determine the cell current in response to adjusting the operation of the three-electrode battery cell to cause the cell voltage to be within the third predetermined range. The controller is further programmed to compare the cell current to the fourth predetermined range. The controller is further programmed to adjust the operation of the three-electrode battery cell using the power control circuit to cause the cell current to be within the fourth predetermined range in response to determining that the cell current is outside of the fourth predetermined range. The controller is further programmed to determine the anode voltage in response to adjusting the operation of the three-electrode battery cell to cause the cell current to be within the fourth predetermined range. The controller is further programmed to compare the anode voltage to the first predetermined range. The controller is further programmed to adjust the operation of the three-electrode battery cell using the power control circuit to cause the anode voltage to be within the first predetermined range in response to determining that the anode voltage is outside of the first predetermined range.

According to several aspects, a battery management method for a three-electrode battery cell for a vehicle is provided. The battery management method may include adjusting an operation of the three-electrode battery cell based at least in part on a plurality of battery metrics where the plurality of battery metrics includes an anode voltage between an anode electrode and a reference electrode of the three-electrode battery cell, a cathode voltage between a cathode electrode and the reference electrode of the three-electrode battery cell, a cell voltage between the cathode electrode and the anode electrode of the three-electrode battery cell, and a cell current flowing through the three-electrode battery cell. The operation of the three-electrode battery cell is adjusted to maintain the anode voltage within a first predetermined range, the cathode voltage within a second predetermined range, the cell voltage within a third predetermined range, and the cell current within a fourth predetermined range.

In another aspect of the present disclosure, determining the plurality of battery metrics and adjusting the operation of the three-electrode battery cell further may include determining the plurality of battery metrics and adjusting the operation of the three-electrode battery cell in a predetermined sequence until the anode voltage is within the first predetermined range, the cathode voltage is within the second predetermined range, the cell voltage is within the third predetermined range, and the cell current is within the fourth predetermined range.

In another aspect of the present disclosure, determining the plurality of battery metrics and adjusting the operation of the three-electrode battery cell in the predetermined sequence further may include determining the anode voltage. Measuring the plurality of battery metrics and adjusting the operation of the three-electrode battery cell in the predetermined sequence further may include comparing the anode voltage to the first predetermined range. Measuring the plurality of battery metrics and adjusting the operation of the three-electrode battery cell in the predetermined sequence further may include adjusting the operation of the three-electrode battery cell to cause the anode voltage to be within the first predetermined range in response to determining that the anode voltage is outside of the first predetermined range. Measuring the plurality of battery metrics and adjusting the operation of the three-electrode battery cell in the predetermined sequence further may include determining the cathode voltage in response to adjusting the operation of the three-electrode battery cell to cause the anode voltage to be within the first predetermined range. Measuring the plurality of battery metrics and adjusting the operation of the three-electrode battery cell in the predetermined sequence further may include comparing the cathode voltage to the second predetermined range. Measuring the plurality of battery metrics and adjusting the operation of the three-electrode battery cell in the predetermined sequence further may include adjusting the operation of the three-electrode battery cell to cause the cathode voltage to be within the second predetermined range in response to determining that the cathode voltage is outside of the second predetermined range. Measuring the plurality of battery metrics and adjusting the operation of the three-electrode battery cell in the predetermined sequence further may include determining the cell voltage in response to adjusting the operation of the three-electrode battery cell to cause the cathode voltage to be within the second predetermined range. Measuring the plurality of battery metrics and adjusting the operation of the three-electrode battery cell in the predetermined sequence further may include comparing the cell voltage to the third predetermined range. Measuring the plurality of battery metrics and adjusting the operation of the three-electrode battery cell in the predetermined sequence further may include adjusting the operation of the three-electrode battery cell to cause the cell voltage to be within the third predetermined range in response to determining that the cell voltage is outside of the third predetermined range. Measuring the plurality of battery metrics and adjusting the operation of the three-electrode battery cell in the predetermined sequence further may include determining the cell current in response to adjusting the operation of the three-electrode battery cell to cause the cell voltage to be within the third predetermined range. Measuring the plurality of battery metrics and adjusting the operation of the three-electrode battery cell in the predetermined sequence further may include comparing the cell current to the fourth predetermined range. Measuring the plurality of battery metrics and adjusting the operation of the three-electrode battery cell in the predetermined sequence further may include adjusting the operation of the three-electrode battery cell to cause the cell current to be within the fourth predetermined range in response to determining that the cell current is outside of the fourth predetermined range. Measuring the plurality of battery metrics and adjusting the operation of the three-electrode battery cell in the predetermined sequence further may include determining the anode voltage in response to adjusting the operation of the three-electrode battery cell to cause the cell current to be within the fourth predetermined range. Measuring the plurality of battery metrics and adjusting the operation of the three-electrode battery cell in the predetermined sequence further may include comparing the anode voltage to the first predetermined range. Measuring the plurality of battery metrics and adjusting the operation of the three-electrode battery cell in the predetermined sequence further may include adjusting the operation of the three-electrode battery cell to cause the anode voltage to be within the first predetermined range in response to determining that the anode voltage is outside of the first predetermined range.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

In aspects of the present disclosure, battery management systems are used to control various battery metrics to ensure proper operation and maximum longevity of batteries. Accordingly, it is advantageous to monitor the various battery metrics and adjust the operation of the battery based on the various battery metrics. However, changes in one battery metric may affect the value of other battery metrics. Therefore, the present disclosure provides a new and improved battery management system and method allowing for continuous control of each of the various battery metrics.

Figure 1:
FIG. 1 is a schematic diagram of a battery management system, according to an exemplary embodiment.

Referring to FIG. 1, a battery management system is illustrated and generally indicated by reference number 10. The battery management system 10 is shown with an exemplary vehicle 12. While a passenger vehicle is illustrated, it should be appreciated that the vehicle 12 may be any type of vehicle without departing from the scope of the present disclosure. The battery management system 10 generally includes a battery cell 14 and a battery management module 16. The battery management system 10 is in electrical communication with an electrical load 18 and a charger 20.

Figure 2:
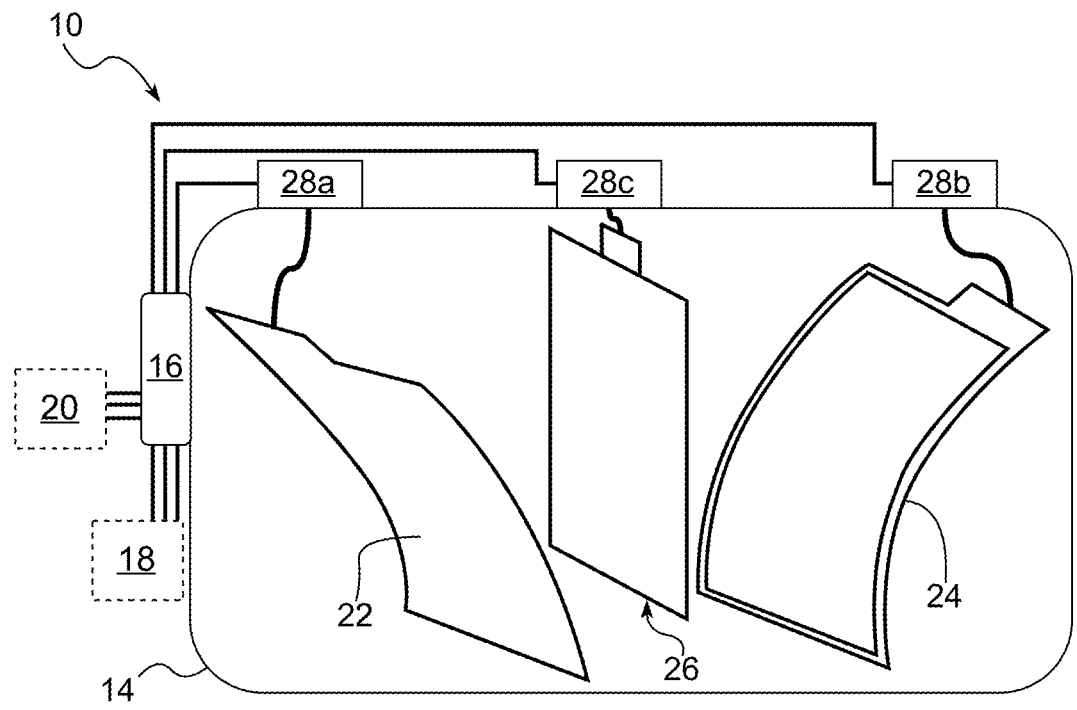
FIG. 2 is a schematic diagram of a battery cell, according to an exemplary embodiment.

Referring to FIG. 2, a schematic diagram of the battery cell 14 is shown. The battery cell 14 is used to store electrical energy in the form of chemical energy. In an exemplary embodiment, the battery cell 14 is a Lithium-Ion battery cell (e.g., a Lithium Cobalt Oxide (LiCoO2) battery cell, a Lithium Manganese Oxide (LiMn2O4) battery cell, a Lithium Iron Phosphate (LiFePO4) battery cell, a Lithium Nickel Cobalt Aluminum Oxide (LiNiCoAlO2 or NCA) battery cell, a Lithium Nickel Manganese Cobalt Oxide (LiNiMnCoO2 or NMC) battery cell, a Lithium Titanate (Li4Ti5O14) battery cell, and/or the like). It should be understood that the battery cell 14 may utilize other cell chemistries besides Lithium-Ion without departing from the scope of the present disclosure. In an exemplary embodiment, the battery cell 14 is referred to as a three-electrode battery cell and includes a cathode electrode 22, an anode electrode 24, a reference electrode 26 disposed between the cathode electrode 22 and the anode electrode 24, and an electrolyte (not shown) in contact with the cathode electrode 22, the anode electrode 24, and the reference electrode 26. It should be understood that while a single battery cell 14 is discussed for the sake of explanation, the disclosure of the present application is also applicable to any series and/or parallel combination of any number of battery cells.

In a non-limiting example, the cathode electrode 22 is made of a mixed metal oxide of lithium, nickel, manganese, and cobalt. In a non-limiting example, the anode electrode 24 is made of graphite. In a non-limiting example, the electrolyte includes a lithium salt dissolved in a solvent (e.g., Lithium hexafluorophosphate (LiPF6), Lithium bis(trifluoromethanesulfonyl)imide (LiTFSI), Lithium perchlorate (LiClO4), and/or the like). The composition of the reference electrode 26 will be discussed in greater detail below.

In an exemplary embodiment, the cathode electrode 22 is electrically connected to a positive terminal 28a of the battery cell 14. The anode electrode 24 is electrically connected to a negative terminal 28b of the battery cell 14. The reference electrode 26 is electrically connected to a reference terminal 28c of the battery cell 14. The positive terminal 28a, negative terminal 28b, and reference terminal 28c allow the battery cell 14 to be connected to other systems for the purpose of measuring one or more states of the battery cell 14 and/or providing power to an external device, as will be discussed in greater detail below. The reference terminal 28c provides a reference electrode voltage used for measurement of a cathode voltage measured between the positive terminal 28a and the reference terminal 28c (i.e., measured between the cathode electrode 22 and the reference electrode 26) and an anode voltage measured between the negative terminal 28b and the reference terminal 28c (i.e., measured between the anode electrode 24 and the reference electrode 26), as will be discussed in greater detail below.

Figure 3:
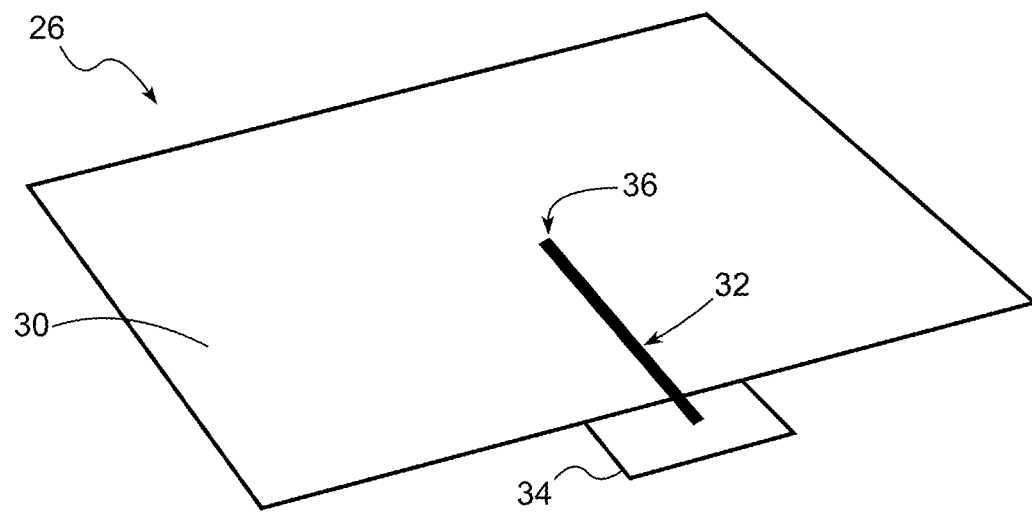
FIG. 3 is a schematic diagram of a reference electrode of the battery cell of FIG. 2, according to an exemplary embodiment.

Referring to FIG. 3, a schematic diagram of the reference electrode 26 is shown. In an exemplary embodiment, the reference electrode 26 includes a separator sheet 30 that holds a reference strip 32 in place. In a non-limiting example, the separator sheet 30 is made of a thin, porous, electrically insulating material which allows the flow of lithium ions while preventing electrical shorts (e.g., polyethylene (PE), polypropylene (PP), and/or the like). The reference strip 32 includes a conductive strip 34 connected to a reference material 36. In a non-limiting example, the reference strip 32 is a flexible structure made of a metal foil (e.g., copper, aluminum, and/or the like) or a polymer film (e.g., polyimide, polyethylene terephthalate, and/or the like). The conductive strip 34 is used to provide an electrical connection between the reference material 36 and the reference terminal 28c. In a non-limiting example, the conductive strip 34 is made of a conductive material (e.g., gold, silver, platinum, copper, and/or the like).

The reference material 36 is an active material which determines the reference electrode voltage of the reference electrode 26. In a non-limiting example, the reference material 36 is made of a lithium compound which has a relatively stable and relatively reproductible electrochemical potential over a relatively wide range of lithium concentration. For example, the reference material 36 may include lithium iron phosphate (LiFePO4), lithium titanate (Li4Ti5O14), lithium cobalt oxide (LiCoO2), and/or the like.

In another exemplary embodiment, the battery cell 14 and the reference electrode 26 are realized according to U.S. Pat. No. 12,113,184, titled "THIN-FILM REFERENCE ELECTRODES, ELECTROCHEMICAL DEVICES INCLUDING THIN-FILM REFERENCE ELECTRODES, AND METHODS OF MAKING THIN-FILM REFERENCE ELECTRODES", filed on May 24, 2022, the entire contents of which is hereby incorporated by reference.

Figure 4:
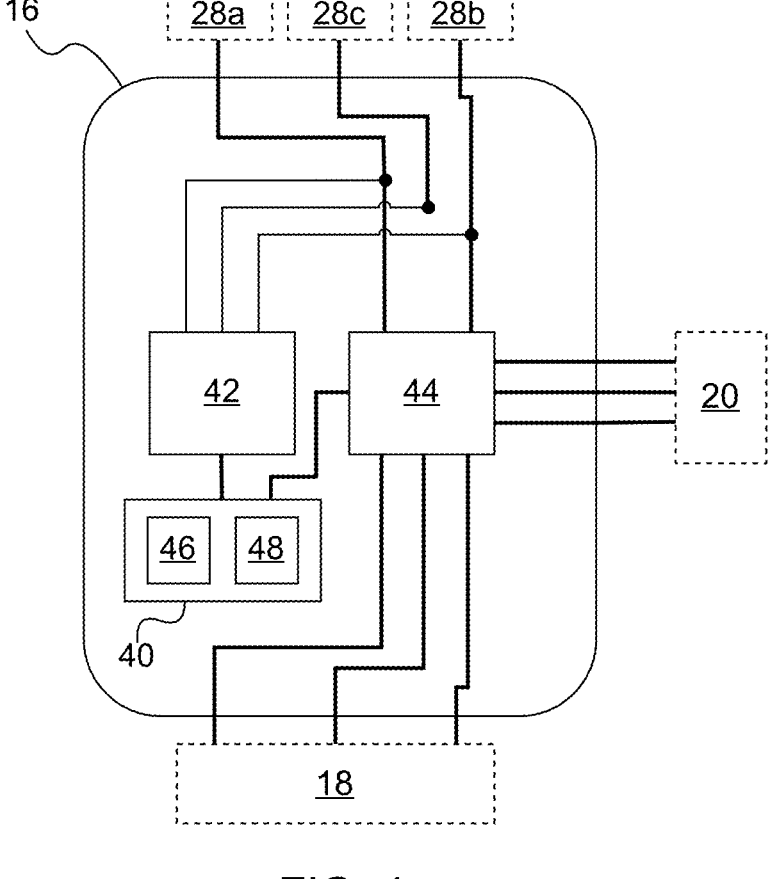
FIG. 4 is a schematic diagram of a battery management module, according to an exemplary embodiment.

Referring to FIG. 4, a schematic diagram of the battery management module 16 is shown. The battery management module 16 is used to control the battery cell 14 in order to provide optimal performance, efficiency, and/or longevity of the battery cell 14. In an exemplary embodiment, the battery management module 16 includes a controller 40, a plurality of battery sensors 42, and a power control circuit 44.

The controller 40 is used to implement a battery management method 100 for the three-electrode battery cell 14, as will be described below. The controller 40 includes at least one processor 46 and a non-transitory computer readable storage device or media 48. The processor 46 may be a custom made or commercially available processor, a central processing unit (CPU), a graphics processing unit (GPU), an auxiliary processor among several processors associated with the controller 40, a semiconductor-based microprocessor (in the form of a microchip or chip set), a macroprocessor, a field programmable gate array (FPGA), an application specific integrated circuit (ASIC), a combination thereof, or generally a device for executing instructions.

The computer readable storage device or media 48 may include volatile and nonvolatile storage in read-only memory (ROM), random-access memory (RAM), and keep-alive memory (KAM), for example. KAM is a persistent or non-volatile memory that may be used to store various operating variables while the processor 46 is powered down. The computer-readable storage device or media 48 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions used by the controller 40 to control the battery management system 10. The controller 40 may also consist of multiple controllers which are in electrical communication with each other. The controller 40 further may include additional elements and/or modules, such as, for example, a real-time clock (RTC) module for measuring the passage of real-time. In an exemplary embodiment, the controller 40 is powered by connection to the positive terminal 28a and the negative terminal 28b of the battery cell 14.

The controller 40 is in electrical communication with the plurality of battery sensors 42 and the power control circuit 44. In an exemplary embodiment, the electrical communication is established using, for example, general purpose input/output (GPIO) pins, an inter-integrated circuit (I2C) bus, a serial peripheral interface (SPI) bus, a parallel communication bus, or the like. It should be understood that various additional communication protocols for communicating with the controller 40 are within the scope of the present disclosure.

The plurality of battery sensors 42 are used to measure a plurality of battery metrics. In an exemplary embodiment, the plurality of battery metrics includes a first battery metric, a second battery metric, a third battery metric, and a fourth battery metric. In a non-limiting example, the first battery metric is the anode voltage, the second battery metric is the cathode voltage, the third battery metric is a cell voltage measured between the positive terminal 28a and the negative terminal 28b (i.e., measured between the cathode electrode 22 and the anode electrode 24), and the fourth battery metric is a cell current flowing through the battery cell 14 (i.e., flowing through the positive terminal 28a and the negative terminal 28b and thus the cathode electrode 22 and the anode electrode 24). In a non-limiting example, the plurality of battery sensors 42 includes, for example, an analog to digital converter (ADC).

The plurality of battery sensors 42 further may include additional components to support voltage measurement, including, for example, a voltage follower, an input buffer, a multiplexer, and/or the like. The plurality of battery sensors 42 further includes components allowing the controller 40 to measure current flow, including, for example, a shunt resistor, an electromagnetic current sensor, an ADC, and/or the like. It should be understood that the plurality of battery sensors 42 further may include additional passive or active analog and/or digital electronics such as, for example, resistors, capacitors, inductors, filters, amplifiers, power electronics, digital to analog converters (DAC), and/or the like. The plurality of battery sensors 42 are in electrical communication with the cathode electrode 22 via the positive terminal 28a, the anode electrode 24 via the negative terminal 28b, and the reference electrode 26 via the reference terminal 28c. The plurality of battery sensors 42 are also in electrical communication with the controller 40 as discussed above.

The power control circuit 44 is used to adjust the operation of the battery cell 14. In an exemplary embodiment, the power control circuit 44 includes switching electronics allowing the controller 40 to connect and disconnect the battery cell 14 (via the positive terminal 28a, the negative terminal 28b, and the reference terminal 28c) to/from the electrical load 18 and/or the charger 20. Furthermore, in an exemplary embodiment, the power control circuit 44 includes power electronics allowing the controller 40 to control a charging current and/or voltage of the battery cell 14 and a discharging current of the battery cell 14. In a non-limiting example, the power control circuit 44 includes, for example, relays, contractors, transistors, and/or the like. In another non-limiting example, the power control circuit 44 further includes, for example, DC-DC converters (e.g., buck-boost converters), AC-DC converters, voltage regulators, current regulators, and/or the like.

It should be understood that the power control circuit 44 further may include additional passive or active analog and/or digital electronics such as, for example, resistors, capacitors, inductors, filters, amplifiers, power electronics, digital to analog converters (DAC), and/or the like. In an exemplary embodiment, the power control circuit 44 is powered by connection to the positive terminal 28a and the negative terminal 28b of the battery cell 14. The power control circuit 44 is in electrical communication with the cathode electrode 22 via the positive terminal 28a and the anode electrode 24 via the negative terminal 28b. The power control circuit 44 is also in electrical communication with the electrical load 18 and the charger 20. The power control circuit 44 is also in electrical communication with the controller 40 as discussed above.

The electrical load 18 includes electrical and/or electromechanical components or systems of the vehicle 12 which require electrical energy for operation. In a non-limiting example, the electrical load 18 includes a traction motor used to convert electrical energy from the battery cell 14 to mechanical energy (i.e., rotational energy) to propel the vehicle 12. In another non-limiting example, the electrical load 18 further includes an infotainment system, vehicle lights, a vehicle heating/cooling system, and/or the like. The electrical load 18 is in electrical communication with the power control circuit 44.

The charger 20 is used to provide electrical energy to charge the battery cell 14. In an exemplary embodiment, the charger 20 includes power electronics such as, for example, DC-DC converters (e.g., buck-boost converters), voltage regulators, current regulators, filters, and/or the like to control and condition incoming power from electric vehicle supply equipment (EVSE) for charging the battery cell 14. In an exemplary embodiment for AC charging, the charger 20 further includes an AC-DC converter (i.e., a rectifier) to convert AC power provided by EVSE to DC power for charging the battery cell 14. The charger 20 is in electrical communication with the power control circuit 44 and a vehicle charging port (not shown).

It should be understood that the battery management system 10 may include additional components such as, for example, DC-AC converters (i.e., inverters), contactors, fuses, additional sensors, and/or the like without departing from the scope of the present disclosure.

In an exemplary embodiment, it is advantageous to maintain the plurality of battery metrics within predetermined ranges in order to increase performance, efficiency, and/or longevity of the battery cell 14. In a non-limiting example, the anode voltage is maintained within a first predetermined range (e.g., having low limit of 0 volts and a high limit of 1.5 volts), the cathode voltage is maintained within a second predetermined range (e.g., having a low limit of 3.2 volts and a high limit of 4.35 volts), the cell voltage is maintained within a third predetermined range (e.g., having a low limit of 2.5 volts and a high limit of 4.2 volts), and the cell current is maintained within a fourth predetermined range (e.g., having a low limit of −100 amps and a high limit of +100 amps). In the scope of the present disclosure, "within" a range means greater than or equal to a low limit of the range and less than or equal to a high limit of the range. In the scope of the present disclosure, "outside of" a range means less than the low limit of the range or greater than the high limit of the range.

In an exemplary embodiment, the first predetermined range, the second predetermined range, the third predetermined range, and the fourth predetermined range are determined based at least in part on a battery chemistry type of the battery cell 14, an electrochemical design or structure of the battery cell 14, a capacity of the battery cell 14, and/or the like. Use of the plurality of battery sensors 42 and the power control circuit 44 to maintain the plurality of battery metrics within the predetermined ranges will be discussed in greater detail below in reference to the battery management method 100.

Figure 5:
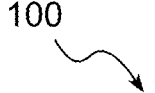
FIG. 5 is a flowchart of a battery management method, according to an exemplary embodiment.
Figure 5:
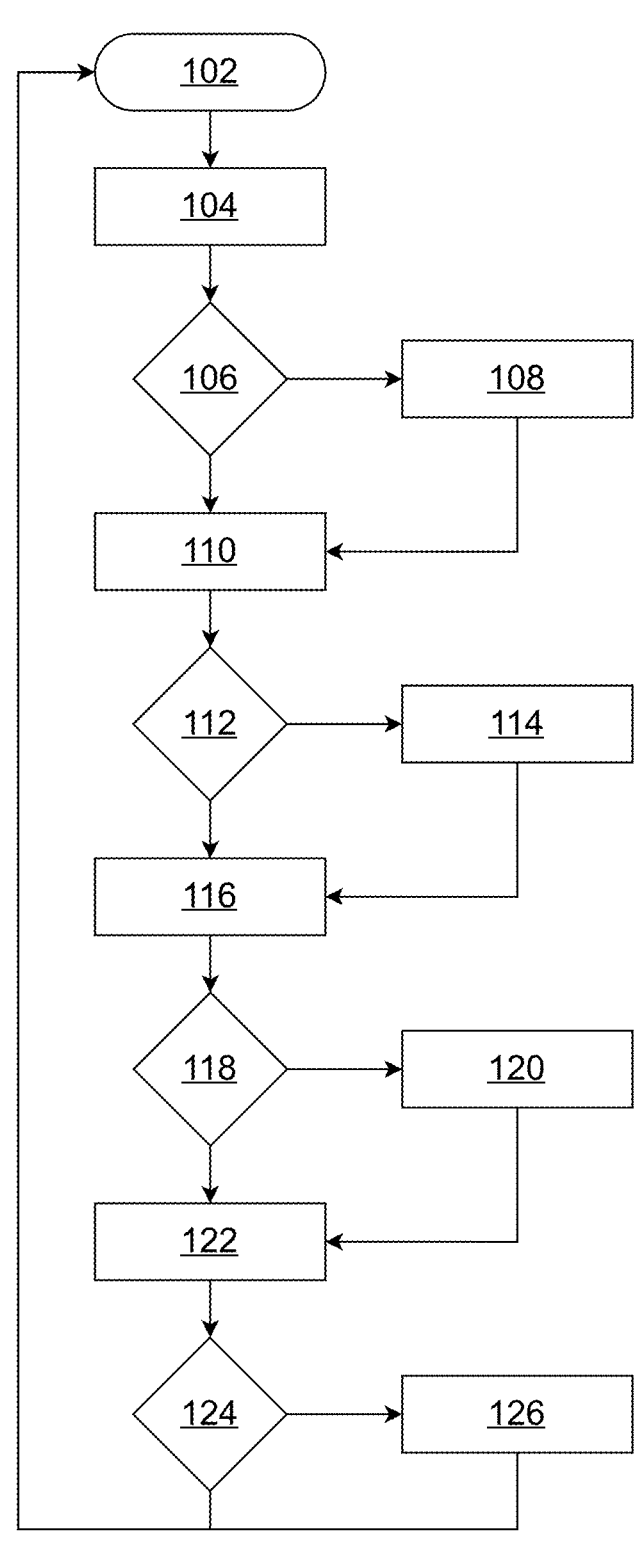

Referring to FIG. 5, a flowchart of the battery management method 100 is provided. The battery management method 100 begins at block 102 and proceeds to block 104. At block 104, the controller 40 determines the anode voltage (i.e., the first battery metric). In an exemplary embodiment, the controller 40 uses the plurality of battery sensors 42 to measure the anode voltage. In another exemplary embodiment, the controller 40 calculates the anode voltage using other measured battery metrics. After block 104, the battery management method 100 proceeds to block 106.

At block 106, the controller 40 compares the anode voltage to the first predetermined range (e.g., 0 to 1.5 volts). If the anode voltage is outside of the first predetermined range, the battery management method 100 proceeds to block 108. If the anode voltage is within the first predetermined range, the battery management method 100 proceeds to block 110.

At block 108, the controller 40 adjusts the operation of the battery cell 14 to cause the anode voltage to be within the first predetermined range. The anode voltage is considered to be the controlled metric. In the scope of the present disclosure, the controlled metric is one of the plurality of battery metrics which is presently controlled by the controller 40 using the power control circuit 44. In an exemplary embodiment, the controller 40 uses the power control circuit 44 to adjust one or more of: an applied voltage across the cathode electrode 22 and the anode electrode 24 of the battery cell 14 and a current flowing through the battery cell 14. In a non-limiting example, the controller 40 uses the power control circuit 44 to adjust the charging current and/or voltage of the battery cell 14 or the discharging current of the battery cell 14 such that the anode voltage is within the first predetermined range.

In another non-limiting example, the controller 40 controls the charger 20 and/or the electrical load 18 to cause the anode voltage to be within the first predetermined range. In an exemplary embodiment, the controller 40 maintains the anode voltage to be within the first predetermined range for at least a predetermined time period (e.g., one minute). During the predetermined time period, the battery management method 100 proceeds to block 110.

At block 110, the controller 40 determines the cathode voltage (i.e., the second battery metric). In an exemplary embodiment, the controller 40 uses the plurality of battery sensors 42 to measure the cathode voltage. In another exemplary embodiment, the controller 40 calculates the cathode voltage using other measured battery metrics. After block 110, the battery management method 100 proceeds to block 112.

At block 112, the controller 40 compares the cathode voltage to the second predetermined range (e.g., 3.2 to 4.35 volts). If the cathode voltage is outside of the second predetermined range, the battery management method 100 proceeds to block 114. If the cathode voltage is within the second predetermined range, the controller 40 continues to maintain the controlled metric (e.g., the anode voltage) to be less than or equal to the corresponding predetermined range (e.g., the first predetermined range) and the battery management method 100 proceeds to block 116.

At block 114, the controller 40 adjusts the operation of the battery cell 14 to cause the cathode voltage to be within the second predetermined range. The cathode voltage is considered to be the controlled metric. In an exemplary embodiment, the controller 40 uses the power control circuit 44 to adjust one or more of: an applied voltage across the cathode electrode 22 and the anode electrode 24 of the battery cell 14 and a current flowing through the battery cell 14. In a non-limiting example, the controller 40 uses the power control circuit 44 to adjust the charging current and/or voltage of the battery cell 14 or the discharging current of the battery cell 14 such that the cathode voltage is within the second predetermined range.

In another non-limiting example, the controller 40 controls the charger 20 and/or the electrical load 18 to cause the cathode voltage to be within the second predetermined range. In an exemplary embodiment, the controller 40 maintains the cathode voltage to be within the second predetermined range for at least a predetermined time period (e.g., one minute). During the predetermined time period, the battery management method 100 proceeds to block 116.

At block 116, the controller 40 determines the cell voltage (i.e., the third battery metric). In an exemplary embodiment, the controller 40 uses the plurality of battery sensors 42 to measure the cell voltage. In another exemplary embodiment, the controller 40 calculates the cell voltage using other measured battery metrics. After block 116, the battery management method 100 proceeds to block 118.

At block 118, the controller 40 compares the cell voltage to the third predetermined range (e.g., 2.5 to 4.2 volts). If the cell voltage is outside of the third predetermined range, the battery management method 100 proceeds to block 120. If the cell voltage is within the third predetermined range, the controller 40 continues to maintain the controlled metric (e.g., the cathode voltage) to be less than or equal to the corresponding predetermined range (e.g., the second predetermined range) and the battery management method 100 proceeds to block 122.

At block 120, the controller 40 adjusts the operation of the battery cell 14 to cause the cell voltage to be within the third predetermined range. The cell voltage is considered to be the controlled metric. In an exemplary embodiment, the controller 40 uses the power control circuit 44 to adjust one or more of: an applied voltage across the cathode electrode 22 and the anode electrode 24 of the battery cell 14 and a current flowing through the battery cell 14. In a non-limiting example, the controller 40 uses the power control circuit 44 to adjust the charging current and/or voltage of the battery cell 14 or the discharging current of the battery cell 14 such that the cell voltage is within the third predetermined range. In another non-limiting example, the controller 40 controls the charger 20 and/or the electrical load 18 to cause the cell voltage to be within the third predetermined range. In an exemplary embodiment, the controller 40 maintains the cell voltage to be within the third predetermined range for at least a predetermined time period (e.g., one minute). During the predetermined time period, the battery management method 100 proceeds to block 122.

At block 122, the controller 40 determines the cell current (i.e., the fourth battery metric). In an exemplary embodiment, the controller 40 uses the plurality of battery sensors 42 to measure the cell current. In another exemplary embodiment, the controller 40 calculates the cell current using other measured battery metrics. After block 122, the battery management method 100 proceeds to block 124.

At block 124, the controller 40 compares the cell current to the fourth predetermined range (e.g., ±100 amps). If the cell current is outside of the fourth predetermined range, the battery management method 100 proceeds to block 126. If the cell current is within the fourth predetermined range, the controller 40 continues to maintain the controlled metric (e.g., the cell voltage) to be less than or equal to the corresponding predetermined range (e.g., the third predetermined range) and the battery management method 100 returns to block 102.

At block 126, the controller 40 adjusts the operation of the battery cell 14 to cause the cell current to be within the fourth predetermined range. The cell current is considered to be the controlled metric. In an exemplary embodiment, the controller 40 uses the power control circuit 44 to adjust one or more of: an applied voltage across the cathode electrode 22 and the anode electrode 24 of the battery cell 14 and a current flowing through the battery cell 14. In a non-limiting example, the controller 40 uses the power control circuit 44 to adjust the charging current and/or voltage of the battery cell 14 or the discharging current of the battery cell 14 such that the cell current is within the fourth predetermined range. In another non-limiting example, the controller 40 controls the charger 20 and/or the electrical load 18 to cause the cell current to be within the fourth predetermined range. In an exemplary embodiment, the controller 40 maintains the cell current to be within the fourth predetermined range for at least a predetermined time period (e.g., one minute). During the predetermined time period, the battery management method 100 proceeds returns to block 102.

The battery management system 10 and the battery management method 100 of the present disclosure offer several advantages. By measuring the battery metrics and adjusting the operation of the battery cell 14 in a predetermined sequence (i.e., the anode voltage followed by the cathode voltage followed by the cell voltage followed by the cell current), the controller 40 may converge to optimal values for each of the plurality of battery metrics without storing a history of which values were previously adjusted.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A battery management method for a three-electrode battery cell, the battery management method comprising:
    adjusting an operation of the three-electrode battery cell based at least in part on a plurality of battery metrics including a first battery metric, wherein the first battery metric is an anode voltage between an anode electrode and a reference electrode of the three-electrode battery cell, a second battery metric, wherein the second battery metric is a cathode voltage between a cathode electrode and the reference electrode of the three-electrode battery cell, a third battery metric, wherein the third battery metric is a cell voltage between the cathode electrode and the anode electrode of the three-electrode battery cell, and a fourth battery metric wherein the fourth battery metric is a cell current flowing through the three-electrode battery cell, wherein the operation of the three-electrode battery cell is adjusted to maintain at least the first battery metric within a first predetermined range, the second battery metric within a second predetermined range, the third battery metric within a third predetermined range, and the fourth battery metric within a fourth predetermined range, wherein adjusting the operation of the three-electrode battery cell further comprises:
        determining the plurality of battery metrics; and adjusting the operation of the three-electrode battery cell in response to determining the plurality of battery metrics,
        wherein determining the plurality of battery metrics and adjusting the operation of the three-electrode battery cell further comprises determining the plurality of battery metrics and adjusting the operation of the three-electrode battery cell in a predetermined sequence until the first battery metric is within the first predetermined range, the second battery metric is within the second predetermined range, the third battery metric is within the third predetermined range, and the fourth battery metric is within the fourth predetermined range.

2. The battery management method of claim 1, wherein adjusting the operation of the three-electrode battery cell further comprises:
    adjusting one or more of: an applied voltage across two or more electrodes of the three-electrode battery cell and a current flowing through the three-electrode battery cell for at least a predetermined time period.

3. The battery management method of claim 1, wherein determining the plurality of battery metrics and adjusting the operation of the three-electrode battery cell in the predetermined sequence further comprises:
    determining the first battery metric;
    comparing the first battery metric to the first predetermined range; and
    adjusting the operation of the three-electrode battery cell to cause the first battery metric to be within the first predetermined range in response to determining that the first battery metric is outside of the first predetermined range.

4. The battery management method of claim 3, further comprising:
    determining the second battery metric in response to adjusting the operation of the three-electrode battery cell to cause the first battery metric to be within the first predetermined range;
    comparing the second battery metric to the second predetermined range; and
    adjusting the operation of the three-electrode battery cell to cause the second battery metric to be within the second predetermined range in response to determining that the second battery metric is outside of the second predetermined range.

5. The battery management method of claim 4, further comprising:
    determining the third battery metric in response to adjusting the operation of the three-electrode battery cell to cause the second battery metric to be within the second predetermined range;
    comparing the third battery metric to the third predetermined range; and
    adjusting the operation of the three-electrode battery cell to cause the third battery metric to be within the third predetermined range in response to determining that the third battery metric is outside of the third predetermined range.

6. The battery management method of claim 5, further comprising:
    determining the fourth battery metric in response to adjusting the operation of the three-electrode battery cell to cause the third battery metric to be within the third predetermined range;
    comparing the fourth battery metric to the fourth predetermined range; and adjusting the operation of the three-electrode battery cell to cause the fourth battery metric to be within the fourth predetermined range in response to determining that the fourth battery metric is outside of the fourth predetermined range.

7. The battery management method of claim 6, further comprising:

determining the first battery metric in response to adjusting the operation of the three-electrode battery cell to cause the fourth battery metric to be within the fourth predetermined range;

comparing the first battery metric to the first predetermined range; and adjusting the operation of the three-electrode battery cell to cause the first battery metric to be within the first predetermined range in response to determining that the first battery metric is outside of the first predetermined range.

8. A battery management system comprising:

a three-electrode battery cell including an anode electrode, a cathode electrode, and a reference electrode;

a plurality of battery sensors in electrical communication with the three-electrode battery cell;

a power control circuit in electrical communication with the three-electrode battery cell; and a controller in electrical communication with the plurality of battery sensors and the power control circuit, wherein the controller is programmed to:

adjust an operation of the three-electrode battery cell using the power control circuit based at least in part on a plurality of battery metrics determined using the plurality of battery sensors, wherein the plurality of battery metrics includes an anode voltage between the anode electrode and the reference electrode of the three-electrode battery cell, a cathode voltage between the cathode electrode and the reference electrode of the three-electrode battery cell, a cell voltage between the cathode electrode and the anode electrode of the three-electrode battery cell, and a cell current flowing through the three-electrode battery cell, wherein to adjust the operation of the three-electrode battery cell, the controller is further programmed to adjust one or more of: an applied voltage across two or more electrodes of the three-electrode battery cell and a current flowing through the three-electrode battery cell for at least a predetermined time period using the power control circuit, and wherein to determine the plurality of battery metrics and adjust the operation of the three-electrode battery cell, the controller is further programmed to determine the plurality of battery metrics in a predetermined sequence and adjust the operation of the three-electrode battery cell in the predetermined sequence until the anode voltage is within a first predetermined range, the cathode voltage is within a second predetermined range, the cell voltage is within a third predetermined range, and the cell current is within a fourth predetermined range, wherein the predetermined sequence is: the anode voltage followed by the cathode voltage followed by the cell voltage followed by the cell current.

9. The battery management system of claim 8, wherein to determine the plurality of battery metrics and adjust the operation of the three-electrode battery cell in the predetermined sequence, the controller is further programmed to:

determine the anode voltage;

compare the anode voltage to the first predetermined range; and adjust the operation of the three-electrode battery cell using the power control circuit to cause the anode voltage to be within the first predetermined range in response to determining that the anode voltage is outside of the first predetermined range.

10. The battery management system of claim 9, wherein the controller is further programmed to:

determine the cathode voltage in response to adjusting the operation of the three-electrode battery cell to cause the anode voltage to be within the first predetermined range;

compare the cathode voltage to the second predetermined range; and adjust the operation of the three-electrode battery cell using the power control circuit to cause the cathode voltage to be within the second predetermined range in response to determining that the cathode voltage is outside of the second predetermined range.

11. The battery management system of claim 10, wherein the controller is further programmed to:

determine the cell voltage in response to adjusting the operation of the three-electrode battery cell to cause the cathode voltage to be within the second predetermined range;

compare the cell voltage to the third predetermined range; and adjust the operation of the three-electrode battery cell using the power control circuit to cause the cell voltage to be within the third predetermined range in response to determining that the cell voltage is outside of the third predetermined range.

12. The battery management system of claim 11, wherein the controller is further programmed to:

determine the cell current in response to adjusting the operation of the three-electrode battery cell to cause the cell voltage to be within the third predetermined range;

compare the cell current to the fourth predetermined range;

adjust the operation of the three-electrode battery cell using the power control circuit to cause the cell current to be within the fourth predetermined range in response to determining that the cell current is outside of the fourth predetermined range;

determine the anode voltage in response to adjusting the operation of the three-electrode battery cell to cause the cell current to be within the fourth predetermined range;

compare the anode voltage to the first predetermined range; and adjust the operation of the three-electrode battery cell using the power control circuit to cause the anode voltage to be within the first predetermined range in response to determining that the anode voltage is outside of the first predetermined range.

13. A battery management method for a three-electrode battery cell for a vehicle, the battery management method comprising:

adjusting an operation of the three-electrode battery cell based at least in part on a plurality of battery metrics wherein the plurality of battery metrics includes an anode voltage between an anode electrode and a reference electrode of the three-electrode battery cell, a cathode voltage between a cathode electrode and the reference electrode of the three-electrode battery cell, a cell voltage between the cathode electrode and the anode electrode of the three-electrode battery cell, and a cell current flowing through the three-electrode battery cell, wherein the operation of the three-electrode battery cell is adjusted to maintain the anode voltage within a first predetermined range, the cathode voltage within a second predetermined range, the cell voltage within a third predetermined range, and the cell current within a fourth predetermined range, wherein measuring the plurality of battery metrics and adjusting the operation of the three-electrode battery cell further comprises:

determining the plurality of battery metrics and adjusting the operation of the three-electrode battery cell in a predetermined sequence until the anode voltage is within the first predetermined range, the cathode voltage is within the second predetermined range, the cell voltage is within the third predetermined range, and the cell current is within the fourth predetermined range.

14. The battery management method of claim 13, wherein determining the plurality of battery metrics and adjusting the operation of the three-electrode battery cell in the predetermined sequence further comprises:

determining the anode voltage;

comparing the anode voltage to the first predetermined range;

adjusting the operation of the three-electrode battery cell to cause the anode voltage to be within the first predetermined range in response to determining that the anode voltage is outside of the first predetermined range;

determining the cathode voltage in response to adjusting the operation of the three-electrode battery cell to cause the anode voltage to be within the first predetermined range;

comparing the cathode voltage to the second predetermined range;

adjusting the operation of the three-electrode battery cell to cause the cathode voltage to be within the second predetermined range in response to determining that the cathode voltage is outside of the second predetermined range;

determining the cell voltage in response to adjusting the operation of the three-electrode battery cell to cause the cathode voltage to be within the second predetermined range;

comparing the cell voltage to the third predetermined range;

adjusting the operation of the three-electrode battery cell to cause the cell voltage to be within the third predetermined range in response to determining that the cell voltage is outside of the third predetermined range;

determining the cell current in response to adjusting the operation of the three-electrode battery cell to cause the cell voltage to be within the third predetermined range;

comparing the cell current to the fourth predetermined range;

adjusting the operation of the three-electrode battery cell to cause the cell current to be within the fourth predetermined range in response to determining that the cell current is outside of the fourth predetermined range;

determining the anode voltage in response to adjusting the operation of the three-electrode battery cell to cause the cell current to be within the fourth predetermined range;

comparing the anode voltage to the first predetermined range; and adjusting the operation of the three-electrode battery cell to cause the anode voltage to be within the first predetermined range in response to determining that the anode voltage is outside of the first predetermined range.

* * * * *